April 30, 1968  F. J. SCHMIDT  3,380,179
AUTOMATIC CONTROL OF SWING SPEED FOR DREDGES
Filed March 20, 1967  5 Sheets-Sheet 1

INVENTOR.
FRED J. SCHMIDT
BY
McNENNY, FARRINGTON, PEARNE & GORDON
ATTORNEYS

INVENTOR.
FRED J. SCHMIDT
BY
MCNENNY, FARRINGTON, PEARNE & GORDON
ATTORNEYS

April 30, 1968 F. J. SCHMIDT 3,380,179
AUTOMATIC CONTROL OF SWING SPEED FOR DREDGES
Filed March 20, 1967 5 Sheets-Sheet 3

INVENTOR.
FRED J. SCHMIDT
BY
McNENNY, FARRINGTON, PEARNE & GORDON
ATTORNEYS

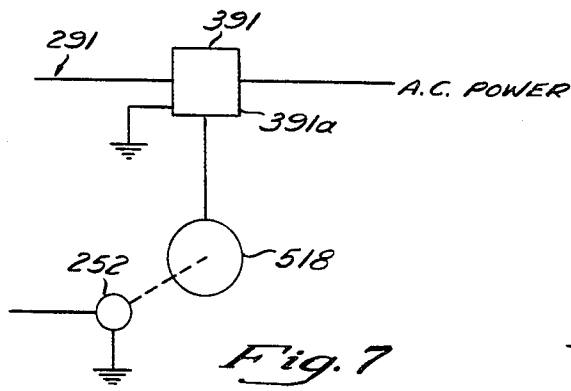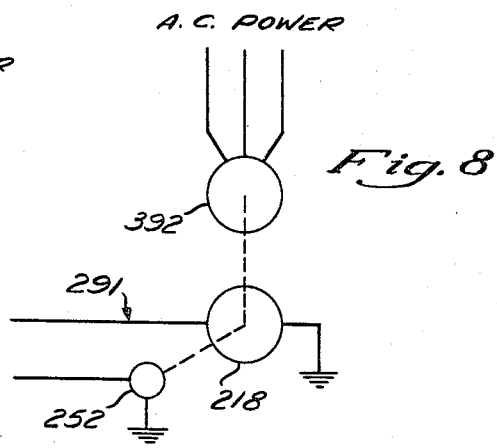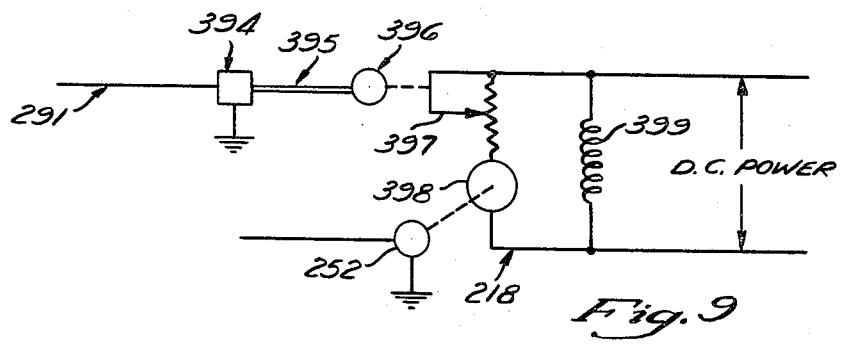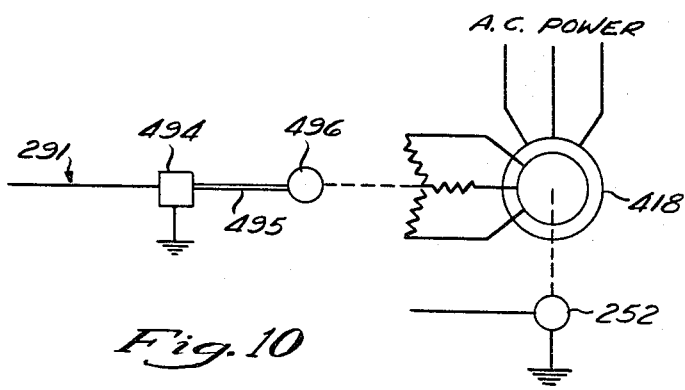

United States Patent Office 3,380,179
Patented Apr. 30, 1968

3,380,179
AUTOMATIC CONTROL OF SWING SPEED FOR DREDGES
Fred J. Schmidt, Baltimore, Md., assignor to Ellicott Machine Corporation, Baltimore, Md., a corporation of Maryland
Continuation-in-part of application Ser. No. 591,193, Nov. 1, 1966. This application Mar. 20, 1967, Ser. No. 633,653
8 Claims. (Cl. 37—58)

ABSTRACT OF THE DISCLOSURE

Automatic speed control for the transverse swing of a dredge cutter comprising a command signal and condition sensors leading to a comparator so that the speed of the motor which induces swing may be varied in accordance with sensed dredging conditions including cutter load discharge pressure and suction pipe pressure, and cutter torque.

---

Figure 2:
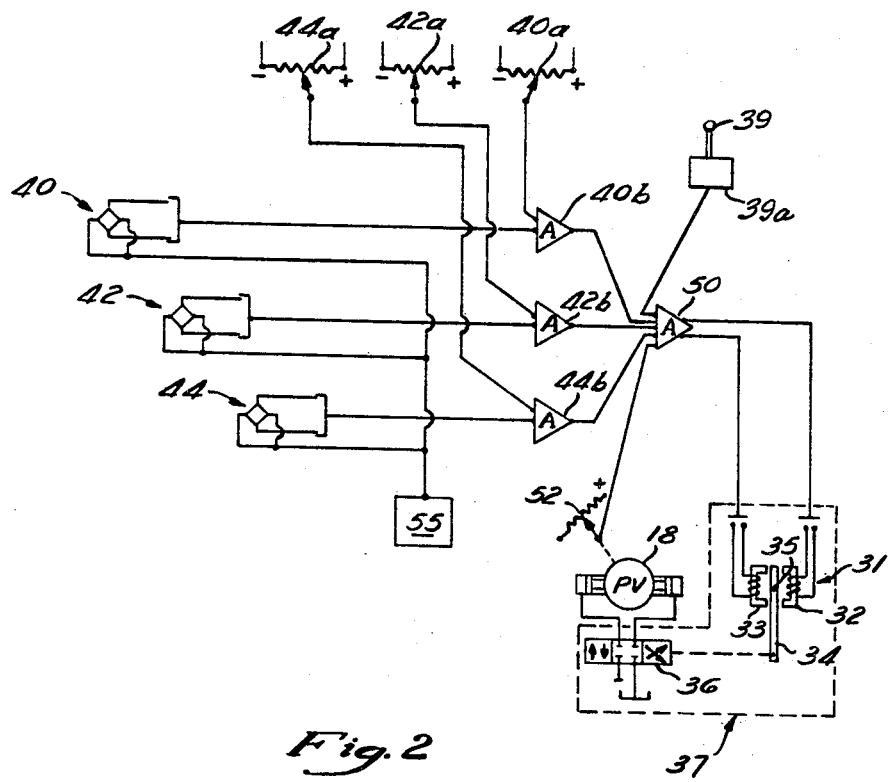

This is a continuation-in-part of my copending application Ser. No. 591,193, filed Nov. 1, 1966, assigned to the assignee of this application, now abandoned.

This invention relates to operational control for dredges and more particularly to a control apparatus which will maintain an optimum rate at which the dredge cutter is moved into engagement with the material to be dredged so as to safely operate the dredge at its maximum production.

The environment of my invention is in hydraulic dredges of the type having a centrifugal dredge pump, a suction pipe conducting water and the dredged material into the dredge pump and a discharge pipe for conducting the water and dredged material away from the dredge pump. A rotary cutter is mounted adjacent the mouth of the suction pipe. Two types of drive for the cutter are disclosed. One type of drive includes a low speed high torque hydraulic motor and the other type of drive for the cutter includes an electric motor. The cutterhead is biased or urged into engagement with the material to be dredged by means of cables and rotating winch drums. Two types of drive for the winch drums are disclosed. One type of winch drum drive includes a variable speed hydraulic motor and the other type of winch drum drive includes an electric motor.

The dredge operator has heretofore had to have much experience in dredge operation before maximum production with existing dredging equipment could be achieved. The actual dredging condition is obscured, by work itself, muddy water prevents direct observation of the cutter which may be a single traverse encounter mud, sand, or rock. The speed of traverse must be varied in accordance with these conditions. The sound of motor strain, and other observable indicia of operation have been helpful to the experienced operator to indicate that a change in swing speed should occur. Such phenomena are, however, not direct and a delay is necessary in the reaction time, and the reaction may not be appropriate to actual dredging conditions.

By employing my present invention much of this work of manipulation based on educated guessing as to dredging conditions is eliminated by automatic sensing means compared to a control which automatically adjusts the speed of the winch motor so that the rate of advance of the cutter toward the material to be dredged is retarded by a high-pressure signal in the dredge discharge pipe, a high vacuum condition in the dredge suction pipe, or a high load on the cutterhead motor, or a combination thereof so that the advance of the cutterhead into the material to be dredged is retarded so that the optimum mixture of solids and liquids will be introduced into the system thereby maintaining the system at normal production whereupon the rate of the advance of the cutterhead is again increased accordingly by acceleration of the winch motor should the optimum mixture decrease.

It is the object of my invention to provide a dredge speed control for the winch motor wherein a signal from a control unit is compared with signals from sensors of dredging conditions, such as from the intake suction pipe, the dredge discharge pipe and cutterhead motor, so that when this comparison indicates a change is desirable in the speed of the motor which controls the traverse of the cutterhead the speed of the motor is appropriately and automatically changed.

It is among the objects of my invention to provide a variable displacement pump for supplying fluid pressure to the winch motor so that the winch motor will be accelerated or decelerated in response to signals from pressure sensing devices arranged to maintain the optimum rate of advance of the cutter into the material to be dredged.

It is a further object of my invention to provide a dredge control in accordance with the preceding objects wherein the hydraulic motor for the cutter is supplied with fluid pressure by a hydraulic pump having inlet and outlet lines connecting the cutter pump and cutter motor and wherein a pressure sensing device is mounted in the inlet line to the cutter motor and such pressure sensing device is connected to the fluid pressure supply for the winch motor so that the winch motor is decelerated in response to a predetermined high pressure signal from said pressure sensing device thereby safely operating the dredge at high production.

It is a further object of my invention to provide a control for a dredge according to the preceding objects wherein a pressure sensing device is mounted in the discharge pipe so as to sense a predetermined high pressure signal in the discharge pipe and wherein the pressure sensing device in the discharge pipe is also connected to the fluid pressure supply for the winch so that the rate of advance of the cutter toward the material to be dredged is retarded by said high pressure signal and more liquid and less solids will be introduced to the dredge pump to reduce the high pressure buildup in the discharge pipe.

It is a further object of my invention to provide a dredge control according to the preceding objects wherein a vacuum sensing device is mounted on the suction pipe to sense a predetermined high vacuum condition in the suction pipe and wherein said vacuum sensing device is also operatively connected to the fluid pressure supply for the winch motor so that the winch motor is retarded, more liquids and less solids will be drawn into the suction pipe thereby reducing the high vacuum condition sensed in the suction pipe.

It is a further object of my invention to provide a dredge control in accordance with the preceding objects wherein the cutterhead motor load is electrically compared with the winch motor's speed and the output of pressure sensing devices for the inlet suction pipe and the discharge pipe to electrically vary the drive speed of the winch motor.

Figure 1:
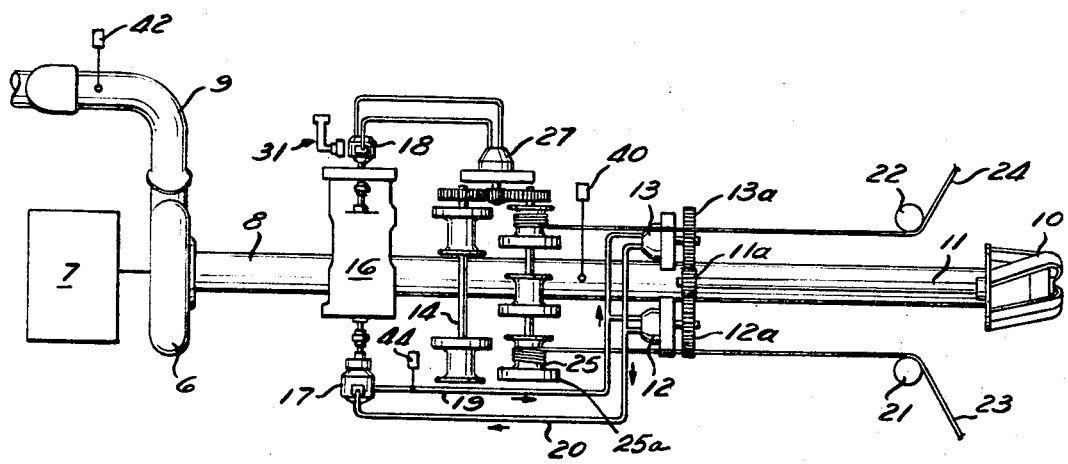
Figure 3:
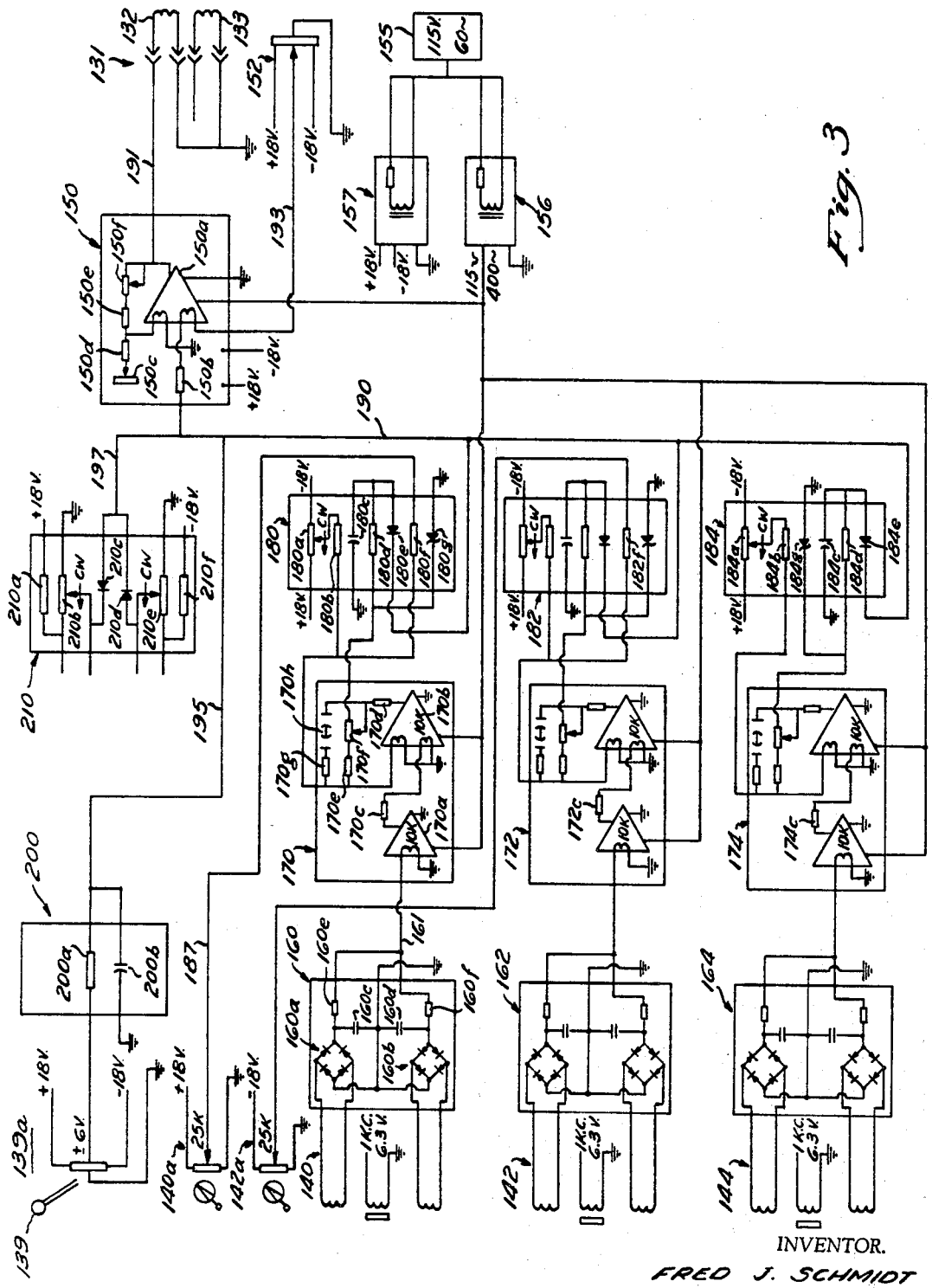
Figure 4:
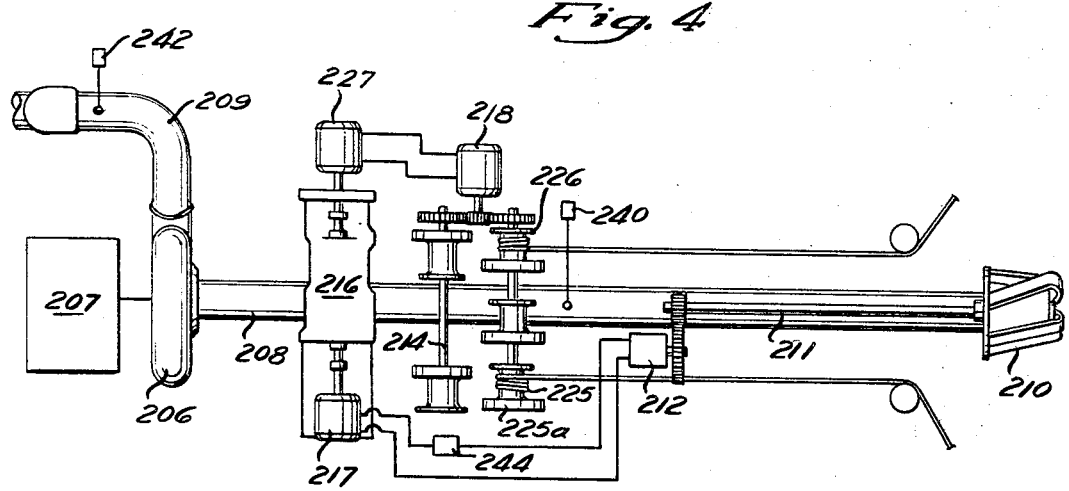
Figure 5:
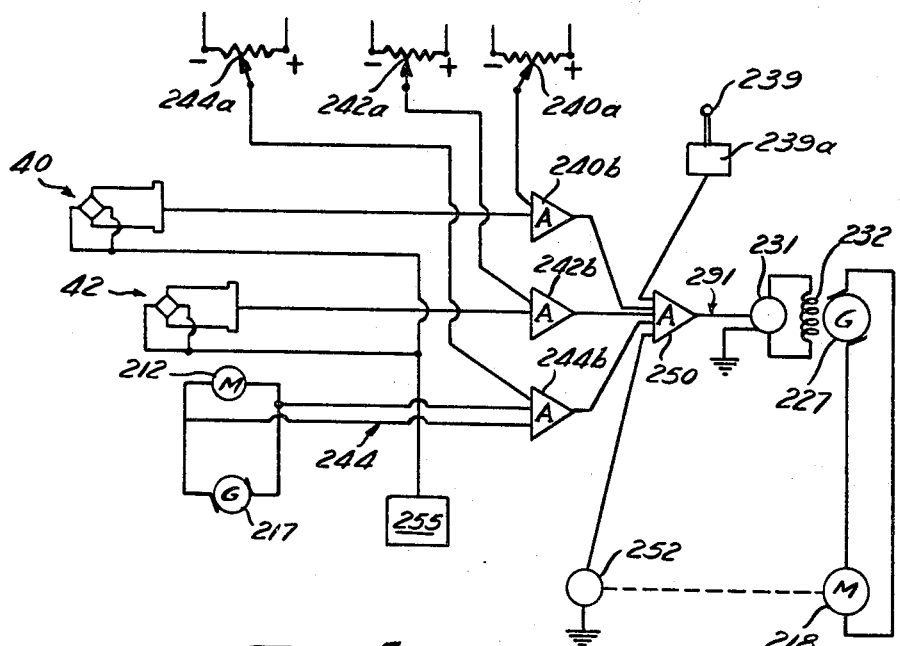
Figure 6:
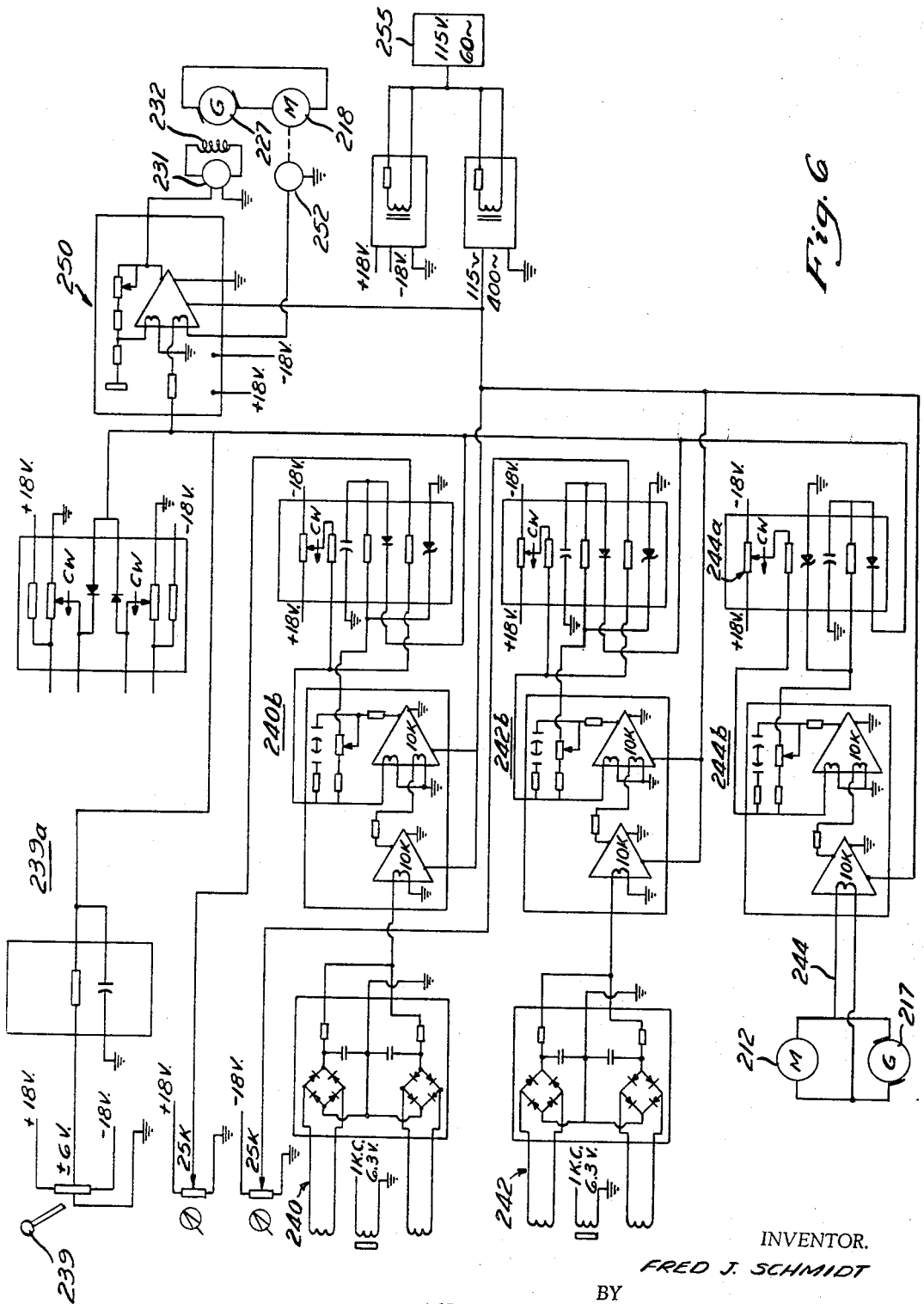

Further objects and advantages of my invention will appear from the following description and the appended drawings wherein:

FIGURE 1 illustrates the dredge apparatus in which my invention is embodied showing hydraulic drives;

FIGURE 2 illustrates a generalized electrical and electronic component diagram for controlling the dredge apparatus; and FIGURE 3 illustrates a modified embodiment of the electrical and electronic component circuit diagram; and FIGURE 4 illustrates the dredge apparatus in which my invention is embodied showing electrical drives; and FIGURE 5 illustrates a generalized apparatus electrical and electronic component diagram for controlling the dredge apparatus using electrical drives; and FIGURE 6 illustrates the embodiment of the electrical component circuit diagram for the electrical drives; and FIGURE 7 illustrates the use of a solid state device to vary the speed of an electrical winch motor; and FIGURE 8 shows another embodiment for controlling the speed of the electrical winch motor by drilling the excitation to eddy current coupling located between a constant speed motor and the hauling winch; and FIGURE 9 illustrates another control for operating a D.C. motor; and FIGURE 10 illustrates another control for operating an A.C. motor.

Referring to the drawings in FIGURE 1 the dredge pump 6 is of the centrifugal type driven by a power unit 7 which is ordinarily a Diesel engine. A suction pipe 8 is connected to the dredge pump inlet and a discharge pipe 9 leads dredged material away from the dredge pump. A rotary cutter 10 mounted at the entrance mouth of the suction pipe is driven by cutter shaft 11 and by the hydraulic cutter drive motors 12 and 13.

Preferably the hydraulic motors 12 and 13 for driving the cutter shaft 11 are of the radial cylinder, low speed type. In the illustrated embodiment the motor 12 drives a spur gear 12a and the motor 13 drives a spur gear 13a (the drive may be by high speed axial motors). The spur gears 12a and 13a are in driving engagement with a spur gear 11a on the cutter shaft 11. It will be understood that the cutter and its drive assembly may be carried by a dredge ladder pivotally mounted at the bow of the hull of a floating dredge. The dredge ladder carrying the suction pipe and cutter assembly may be raised and lowered by hauling machinery indicated at 14.

Generally the hauling machinery, including the swing winches for moving the dredge, are carried in a deck house on the hull of the dredge and auxiliary power unit, such as that indicated at 16, is provided to drive a cutter pump as indicated at 17 and a swing winch pump as indicated at 18. Again the hauling machinery may also in certain cases be mounted on the ladder.

The hydraulic pump 17 for the cutter motors directs hydraulic fluid under pressure through the inlet conduit 19 to the fluid inlets on cutter drive motors 12 and 13. A return conduit 20 returns hydraulic fluid from the cutter motors back to the cutter pump 17.

Near the outboard end of the ladder pulleys such as 21 and 22 are pivoted so that swing cables such as 23 and 24 may be guided thereover for moving the dredge bodily relative to the area being dredged. Cables 23 and 24 lead to anchors forwardly of the dredge. The swing anchors may be moved forward step-by-step with an anchor boom or may be secured to trees or land based objects. Rotation of the starboard winch drum 25 so as to wind the cable 23 thereon will swing the dredge bodily to the starboard and thereby bias the cutter 10 to starboard and into the work or material being dredged.

Each winch drum is provided with suitable clutches and brakes located in a housing 25a adjacent the drum. The operator may override the described control system by declutching the drum and applying the brake. A preferred form specific to this hauling machinery disclosed is shown in my U.S. Patent No. 3,094,795, issued June 23, 1963.

The cutting action taking place under water at the bottom of the area being dredged cannot be observed by the dredge operator. The material being dredged may vary widely and thus include sand, clay, shale, and the like. Assuming that the material being engaged by the cutter 10 is relatively soft and the suction pipe and dredge pump will handle all of the liquid and solids being moved through the suction pipe, it is desirable to advance the cutter 10 into the work rapidly. On the other hand, in the event the cutter 10 loosens chunks of clay which are drawn into the suction pipe entrance at a higher rate than the dredge pump will elevate the material and move it to the discharge pipe, an excessively high vacuum condition will exist between the entrance mouth of the suction pipe and the dredge pump. To relieve such excessively high vacuum condition and prevent a plugging or blocking of the suction pipe 8 near its entrance mouth, the advancance of the cutter 10 into the work should be retarded. This will result in more fluids and less solids being moved to the entrance of the suction pipe and the additional fluid will scavenge or wash through the accumulation in the suction pipe and thus restore the vacuum in the suction pipe to a predetermined lower value which will correspond to the highest efficiency of the dredge operation.

For purposes of illustration it is desirable to maintain a working range of vacuum in the nature of 20–26 inches of mercury in the suction pipe 8. In the event the vacuum increases beyond the 26 inches of mercury named, the advance of the cutter 10 into the work should be retarded and the addition of solids into the suction pipe thus interrupted until the vacuum condition has dropped back within the working range of 20–26 inches of mercury.

Depending on a number of variables, such as the length of the discharge pipe 9, the elevation of the outlet for the discharge pipe 9 and the bends or turns in the discharge pipe 9, pressures will vary within a wide range in the discharge pipe. High pressures in the discharge pipe, particularly pressures developed at a sharp bend in the discharge pipe, introduce danger of rupture such as may destroy the discharge pipe and injure workmen moving or working around the discharge pipe. Accordingly it is desirable to maintain the pressure within a safe working range for maximum efficiency of the dredge.

The solids being carried in the dredge discharge pipe may tend to block the discharge pipe at any point along its length and it is desirable to detect any such blocking before a dangerously high pressure occurs. In a typical installation it is desirable to maintain the maximum pressure in the discharge pipe within a range of 80 to 100 p.s.i. Higher pressures in the discharge pipe may be relieved by retarding the advance of the cutter into the work so that more fluid and less solids will be carried into the discharge pipe by the dredge pump. Thus any tendency of the discharge pipe to block may be corrected by the introduction of the additional fluids at the mouth of the suction pipe. The scavenging action of the fluid in the discharge pipe is like the scavenging action of the fluid in the suction pipe.

In the event the cutter 10 should engage hard material to be cut such as shale, coral rock, tree trunks, and the like, the fluid pressure on the inlet line 19 will increase. In a typical instance it is desirable to keep the fluid pressure in the line 19 and the pumps 12 and 13 within a range of 2000 to 2040 p.s.i. Again the high pressure is relieved by retarding the advancing motion of the cutter into the material to be dredged thereby reducing the load upon the cutter.

In each of the above described cases, either the excessive vacuum in the suction pipe 8, the excessive pressure in the discharge pipe 9, or the excessive pressure in the cutter inlet line 19 is relieved by retarding the advancing motion of the cutter 10 into the material to be dredged. This is accomplished by reducing the output volume of the swing winch pump 18 to decelerate the swing winch motor 27. Preferably the swing winch motor 27 is of the low speed, high torque hydraulic type heretofore described in connection with the cutter drive motors. It should be understood, however, that my invention may be adapted for use with any positive displacement hydraulic motor. Thus, it could be used in those dredges which currently employ hydraulic linear power actuators for swinging the cutter.

Preferably the hydraulic pump 18 for the swing winch motor is of the multi-cylinder swash plate type so that the tilting of the swash plate varies the piston stroke and thus varies the output of the pump. It will be understood that the tilt of the swash plate to zero angle would reduce the output of the pump 18 to zero and thus arrest all of the movement of the cutter 10 towards the material to be dredged.

The tilt of the swash plate in the pump 18 is controlled by a servo-valve mechanism 37 the components of which are shown schematically in FIGURE 2 enclosed within a dotted box. One servo-valve arrangement suitable for this purpose is disclosed in U.S. Patent No. 2,884,907 to R. D. Atchley, issued May 5, 1959. Schematically the servo-valve mechanism 37 includes a torque motor 31 having a right-hand field coil 32 and a left-hand field coil 33. The armature 34 of the torque motor is pivoted at 35 in such a manner that as it is rocked about the pivot by the field coils a valve spool 36 is caused to slide in one direction or the other within a valve body. Servo-valve mechanism 37 is arranged so that movement of the valve spool 36 in one direction reduces the output volume of the swing winch pump 18 and thus decelerates the swing winch motor 27.

During the normal operation of the dredge, the operator manually controls the speed of the swing winch motor 27 by a quadrant lever 39 on the operator's quadrant control panel 39a. The lever 39 is electrically connected to the servo-valve mechanism 37 through a reactor amplifier 50 in such a manner that as the servo-valve spool 36 is shifted proportionally according to the input current to the torque motor 31 from the reactor amplifier 50 the tilt of the swash plate in pump 18 is changed in direct proportion to the position of the lever 39.

In accordance with the present invention, the signals from the control quadrant 39 to the torque motor 31 are automatically overridden by reducing the speed of the swing winch which is set at maximum by the quadrant control in response to any pressure deviations in any one of the three lines 8, 9, or 19 either above or below the prescribed range. The changes in pressure being sensed by appropriate sensing means here illustrated by pressure transducers 40, 42, and 44 operatively connected to the lines 8, 9, and 19, respectively.

The transducers 40, 42, and 44 may be of the strain gauge type, a pressure responsive diaphragm, or other equivalent structure which will respond to the range of pressures encountered. In the generalized electrical component diagram of FIGURE 2, electrical strain gauge transducers are illustrated with their circuit wiring diagram. The circuit includes three command signal potentiometers 40a, 42a, and 44a upon which the operator may set the desired pressure limit for each transducer.

Since the operation of each pressure transducer is substantially the same, only the operation of the vacuum transducer 40 will be described in detail. As the vacuum in the suction pipe 8 varies, a signal is sent from the transducer 40 to a command amplifier 40b where it is compared with a signal from the command signal potentiometer 40a. If the value of the signal from transducer 40 is within the limit set on the command potentiometer 40a, the amplifier 40b will not transmit a signal to the torque motor 31 of the servo-valve mechanism 37. However, should the vacuum in suction pipe 8 rise above 26 inches of mercury, indicating that the suction pipe is clogged, a negative signal from the transducer 40 is fed into the amplifier 40b. Since this negative signal is less than the value set on the command signal potentiometer 40a, a signal is fed into the reactor amplifier 50 causing a negative current to be sent to the torque motor 31. This causes the servo-valve spool 36 to be moved in one direction to a position wherein the swash plate in the variable displacement pump 18 is moved to a low angle substantially destroking the pump and reducing the pump output.

A feedback potentiometer 52 is interconnected with the pump 18 and monitors the tilt angle of the swash plate. The signal from the feedback potentiometer 52 is transmitted to the reactor amplifier 50 wherein the feedback signal and the command signal from the command amplifier 40b are compared. If these two signals are different the resulting positive or negative signal is amplified and transmitted to the torque motor 31 actuating the Servo valve spool 36 to change the tilt angle of the swash plate and thereby reduce the difference between these two signals to zero.

As the vacuum in the suction pipe 8 decreases to about 24 inches of mercury due to the scavenging effect of the increased amount of liquid passing therethrough, a positive signal from the transducer 40 changes the voltage to the reactor amplifier 50, causing a positive current to be sent to the torque motor 31. This moves the Servo valve spool 36 in the opposite direction increasing the tilt of the swash plate; thus, increasing the stroke and the output of the pump 18 to the motor 27. As soon as the stroke of the pump has increased in proportion to the signal, the feedback potentiometer 52 sends an equal voltage to the reactor amplifier 50 reducing the current to the torque motor 31 to zero stabilizing the position of the Servo valve 37 and thus the output of the pump 18.

Should the vacuum in the suction pipe 8 fall below 20 inches of mercury, the system would operate in a similar manner to increase the output of the pump 18 and thus the rate at which the cutter 10 advances into the material to be dredged.

In a similar manner, the command signal potentiometers 42a and 44a for the discharge pipe transducer 42 and the cutter supply line transducer 44 also control the output of the pump 18, and any of the three command signal potentiometers 40a, 42a and 44a may override the other to control the output of the pump 18 to the motor 27. This allows the cutter 10 to be advanced into the material to be dredged at the maximum allowable speed at all times; thus, optimizing the output of the dredge.

Referring to the electrical diagram of FIGURE 2, a direct current supply, such as a generator driven by the power unit 16, is shown diagrammatically at 55. In the circuit illustrated in FIGURE 2 the direct current supply will provide eighteen volts going to each of the transducers 40, 42 and 44.

It is to be understood that the electrical circuit for controlling the swing of the dredge can take any one of a number of different specific forms which are effective to produce the desired results. One such modified embodiment of the electrical circuit is illustrated in detail in FIGURE 3. In the embodiment of FIGURE 3, the transducers 140, 142 and 144 are of the linear variable differential transformer type. The power supply to the circuit is from a 115-volt, 60-cycle power source on the dredge supplying alternating current to an inverter 156 which increases the frequency to 400 cycles for more efficient operation of the circuit. An 18-volt DC current is supplied to the components through the lines marked +18V and −18V by passing the 115-volt, 60-cycle supply current from the power source 155 through a DC rectifier 157. Each transducer is supplied with a 6.3-volt, 1-kilocycle supply voltage from a suitable source.

Since the portion of the circuit between the three transducers and the pump amplifier are substantially the same, this portion of the circuit for one transducer, 140, will be described in detail. The output signals from the two output coils of the transducer 140 are transmitted to a demodulator module 160 comprising a full wave bridge diode rectifier for each input. The two bridges are connected in opposite directions to give a positive DC output voltage with respect to the ground from the one coil and a negative DC voltage from the other coil. These DC outputs are connected together to give a single DC output which is the algebraic sum of the positive and negative signals. In this specific circuit the pair of full wave bridge diode rectifiers 160a and 160b are each composed of four 1N2070 diodes, and to reduce the output ripple, a filter is used comprising two .075 mfd. 600-volt capacitors 160c and 160d, and two 4.7K-ohm resistors 160e and 160f.

From the demodulator module 160 the signal is transmitted through line 161 to a control amplifier module 170 from which an amplified signal is transmitted to the pump amplifier module 150. The control amplifier module 170 includes a linear variable differential transformer amplifier 170a connected to a pressure differential amplifier 170b through a 1.8K-ohm resistor 170c. In the modules 172 and 174 the corresponding resistor has a value of 1.5K and 1K-ohms, respectively.

In the pressure differential amplifier 170b the signal from the transformer amplifier 170a is compared with a pre-set signal from a command potentiometer 140a transmitted through line 187 and a 330K-ohm resistor 180f in a pump pressure module 180. For the pressure module 182, the corresponding resistor 182f is a 270K-ohm resistor. The resulting signal is transmitted from the pressure differential amplifier 170b through a 330-ohm resistor 170d to a feedback circuit composed of a 22K-ohm resistor 170e and a 500K-ohm variable resistor 170f. In order to slow down the destroking action of the torque motor 131 on the pump 18 this signal is also transmitted to a delay circuit composed of a 15K-ohm resistor 170g and a pair of back to back 47-mfd., 35-volt capacitors 170h.

The resulting signal from the control amplifier module 170 is transmitted to the pump pressure module 180 which controls the pressure settings for activating the torque motor 131 on the pump 18. The pump pressure module 180 includes the resistor 180f referred to above, a pressure set circuit composed of a 25K-ohm variable resistor 180a and a 82K-ohm resistor 180b as well as a filter circuit composed of a 2-mfd., 50-volt capacitor 180c, a 100K-ohm resistor 180d, a 1N2070 diode 180e, a 330K-ohm resistor 180f, and a 7-volt Zener diode 180g. In the case of the circuit in the pump pressure module 184 for the cutter inlet pressure transducer 144, the pressure range is set on the variable resistor 184a rather than a separate command potentiometer such as 140a and 142a. In this modified embodiment of FIGURE 3 (and also as will be seen in FIGURE 6) there is no command potentiometer as shown in FIGURE 2 because sufficient control over the cutter speed is still provided by the variable resistor 184a since it is possible in dredging to run the cutter at a constant speed and compensate for variable dredging conditions by varying the traverse speed of the cutter head.

The positive or negative signal from the transducer is transmitted from the pump pressure module 180 through line 190 to the pump amplifier module 150 which controls the actuation of the torque motor on the pump 18. The pump amplifier module 150 includes a comparator amplifier 150a, which receives an original control signal through a 12K-ohm resistor 150b. The amplified positive or negative output signal from the amplifier 150a goes through a feedback circuit in the module 150 composed of a 25K-ohm variable resistor 150c, a 68K-ohm resistor 150d, a 12K-ohm resistor 150e, and a 500K-ohm variable resistor 150f and is also transmitted through line 191 to the torque motor 131 to actuate the appropriate coil 132 to 133.

To prevent over actuation of the pump 18 a feedback potentiometer 152 transmits a counter signal through line 193 to the amplifier 150a in the pump amplifier module 150 to reduce the output of the amplifier 150a to zero when the stroke of the pump 18 has been changed according to the original positive or negative signal received by the pump amplifier.

The output from the quadrant control panel lever 139 is also connected to the comparator amplifier 150a in the module 150 through line 195 for normal manual operation of the swing speed by the operator. The signal from the lever 139 passes through a module 200 containing a filter circuit composed of a 2.2K-ohm resistor 200a and a 1-mfd., 200-volt capacitor 200b.

The maximum cutter swing velocity is limited by a winch speed control module 210 also connected to the amplifier 150a in the pump amplifier module 150 through line 197.

The winch speed control module 210 includes a cut velocity limiter comprising a 2.2K-ohm resistor 210a, a 1K-ohm variable resistor 210b on which is pre-set the value for the maximum winch speed for swinging the cutter into the material being dredged, and a 1N2070 diode 210c and a return velocity limiter comprising a 1N2070 diode 210d, a 1K-ohm variable resistor 210e on which is pre-set the value for the maximum winch speed for returning the cutter to the starting position upon the completion of a cut, and a 2.2K-ohm resistor 210f.

My invention is not limited to an automatic control apparatus which hydraulically controls the swing winches. FIGURES 4 through 11 illustrate an automatic electrical control apparatus which employs electric motors for both the cutter and the swing winch drum.

Referring to FIGURE 4 which illustrates the dredge apparatus in which my invention showing electrical drives is embodied, the dredge pump 206 is also of the centrifugal type driven by a suitable power unit 207. The suction pipe 208 supplies dredged material and fluids to the pump and is discharged through discharge pipe 209. An electrical motor 212 acting through a suitable spur gear reducer drive rotates cutter shaft 211 and consequently the rotary cutter 210. The cutter generator 217 of the cutter motor-generator set is mounted on the hull of the dredge adjacent an auxiliary powered unit 216 so that the armature of the generator may be driven by the auxiliary powered unit.

In a similar manner an electrical motor-generator set can be mounted for driving the swing winch hauling machinery similar to that previously described including a starboard swing winch drum 225 and a port swing winch drum 226. The swing winch-generator 227 is mounted adjacent the same auxiliary power unit 216 and is connected to the winch motor which is utilized to drive the hauling machinery indicated generally as at 214 by a suitable reducer. The hauling machinery winch motor 218 is driven at a speed appropriate for the dredging requirements as previously described.

As has been described for a hydraulic system, vacuum in the suction pipe 208, pressure in the discharge pipe, and load on the cutter head motor is sensed by appropriate sensors. Transducer 240 is operatively connected to the suction line and transducer 242 is operatively connected to the discharge pipe. A suitable transducer 244 is connected to sense the load on the cutter motor 212. Load sensing of the cutter motor is based on a voltage shunt in a DC cutter motor-generator set. Although not specifically illustrated an ammeter shunt could also be used in such a situation. Should the cutter motor be AC, a current transformer in the AC cutter motor lead would be employed.

In the generalized electrical component diagram of FIGURE 5, two electrical strain gauge transducers are illustrated with their circuit wiring diagram to measure the vacuum in the suction line and pressure in the discharge pipe while a voltage shunt transducer is illustrated for measuring the load on the cutter motor. The circuit includes three command signal potentiometers 240a, 242a, and 244a upon which the operator may set the desired pressure limit for each transducer from a suitable control panel.

The three signals, or any one of them, are amplified by amplifiers 240b, 242b and 244b, respectively. After application the signals are compared with a command signal from the quadrant control including quadrant control lever 239 and operator's quadrant control panel 239a. The quadrant control may be of the type previously described with reference to the hydraulic control system. The comparator amplifier 250, which also may be of the type previously described (150a), is also supplied with a feedback signal from a winch speed indicator signal generator which is preferably tachometer generator 252. The tachometer generator is preferably actuated by an eddy current from the swing winch hauling machinery motor 218.

The resulting signal from the comparator amplifier 250 is used to change the speed of the hauling machinery winch motor as described below.

By controlling the output of winch generator 227 the hauling machinery winch motor 218 may be regulated. In FIGURES 4 and 5, generator 227 is the DC generator of the motor-generator set while 218 is the DC motor of the set. The comparator amplifier 250 supplies a differential voltage to an electrical control regulator shown as the regulating exciter 231 which, in turn, provides a control voltage for generator 227 via field 232. This field may change the voltage impressed upon the armature of the motor and, accordingly, in such an instance, the speed of the motor is made dependent upon the voltage supplied the field 232. As will be recalled by those reading this description, suitable control systems which may be employed for AC or DC systems are Ward Leonard, Amplidyne, Rotorol, Regulex, or other appropriate exciter control.

As may be seen from FIGURE 6, the circuitry therein shown are substantially identical of that shown in the modified embodiment of FIGURE 3 with the exceptions noted and described with respect to FIGURE 5.

As shown in FIGURE 7 a speed changer 518 is coupled to AC power. Such a device may be utilized to change the speed of the motor. The terminal line of the comparator amplifier 250 leads in the embodiment shown in FIGURE 7 to a speed changer which may be a solid state device which is energized by an AC power supply coming from an alternator driven by a suitable auxiliary power source such as 216. The device may employ an inverter 391 for converting the differential voltage from terminal line 291 into alternating current which preferably is employed to provide an AC phase-shift control for the alternating current leading to AC motor 218. According to the phase-shift, the motor is accelerated or decelerated, thus varying the speed of rotation of the swing winch drums 226 and 225. This speed of rotation of the drums is measured by a tachometer generator 252 driven by eddy current by the motor and leading to control amplifier 250 as has been described.

When a direct current motor is employed in the embodiment shown in FIGURE 7 it is preferred that a suitable control rectifier, or the like, accorded reference numeral 391a, be used. In such an instance the control rectifier, such as a silicon controlled rectifier having anode, cathode, and a control or gate electrode, is coupled in a series between the motor filed windings and motor armature windings of the direct current motor 218. A suitable source of alternating current is coupled across this circuit. The terminal lead 291 from comparator amplifier 250 is suitably connected to the gate electrode. Accordingly, the point at which the controlled rectifier begins its conduction or firing is determined by the characteristics of the voltage in the lead 291 and the speed of DC motor 218 is varied in response to this voltage. In such a manner the speed of rotation of the swing winch drum and the traverse of the cutterhead is controlled.

The circuitry for the controlled rectifier has not been shown, but the reader will appreciate that the circuitry is of the type shown in U.S. Patent No. 3,165,688 to F. W. Gutzwiller, issued January 12, 1965, and like circuits manufactured by the General Electric Company.

In FIGURE 8 AC motor 218 is driven by an eddy current coupling located between constant speed motor (which may be AC or DC but is shown as AC) 392. The applied voltage from the eddy current must be large enough to overcome the counter EMF and also the EMF supplied via line 291 from the control. As the control voltage varies so does the speed of the armature. The speed regulation of the motor armature controls the speed of rotation of the swing winch drum by the linkage previously described.

In the winch motor control embodiment shown in FIGURE 9, a DC motor is employed as a hauling machinery motor. A source of DC power is supplied from a generator which may be actuated by a suitable auxiliary power source 216. Terminal lead line 291 is connected to actuate an electro-hydraulic servovalve 394. The electro-hydraulic servovalve by an hydraulic connecting line 395 actuates hydraulic servomotor 396 which in turn operates the rheostat control 397. The adjustable resistance provided by the rheostat 397 is in series with the armature 398 of motor 218. Since the armature motor windings and the field motor windings 399 are in parallel, the speed of rotation of the armature is varied by varying the resistance by means of the hydraulic servomotor. A similar control which is not shown may be utilized using the same elements but reversing the position of the armature and field so that control of the armature is accomplished by placing in series with the shunt field winding of the motor the adjustable resistance.

The use of the terminal lead signal to actuate an electro-hydraulic servovalve and hydraulic servomotor is not limited to DC machines. In FIGURE 10 it may be seen that one can use a controllable speed AC machine such as a wound-rotor induction motor 419. The electro-servovalve 494 operates by line 495 to actuate hydraulic servo-motor 496 which, in turn, actuates a rheostat in series with the primary windings of the motor. By adjusting the resistance the speed of the controllable motor is adjusted.

Though several controls for motors and means changing the speed of controllable motors has been illustrated, it should be understood that other controls and motors may be utilized; it should also be understood that while several embodiments of this invention have been shown and described in detail, various modifications, omissions, and refinements may be made therein without departing from the scope of the invention as defined in the following claims.

What is claimed is:

1. In a suction dredge having a dredge cutterhead, a cutterhead drive motor means, cutterhead positioning motor means, a suction pipe, a motor means for producing suction in said suction pipe, a discharge pipe and apparatus for controlling the output of the dredge by causing more or less solids to be introduced into the defined suction system and be discharged therefrom, said apparatus comprising first means to sense dredge operation, second means connected to said first means and said cutterhead positioning motor means for varying the speed of said cutterhead positioning motor means in response to variations in said first operation sensing means to thereby maintain an optimum mixture of solids and liquids in said defined suction system.

2. A suction dredge according to claim 1 wherein said apparatus includes command signal generating means for generating a command signal, a second generating means for generating a second signal in response to said first operation sensing means, and said second means includes a comparator of said command and second signals, and third means for varying the speed of said cutterhead positioning motor in response to a signal from said comparator.

3. A suction dredge according to claim 2 wherein said second generating means comprise cutterhead load sensing means, discharge pipe pressure sensing means, and suction pipe vacuum sensing means.

4. A suction dredge according to claim 1 wherein said first operation sensing means comprise transducer means for sensing load on said cutterhead drive motor means, a discharge pipe pressure transducer for sensing pressure in said discharge pipe, a suction pipe sensing transducer for sensing vacuum in said suction pipe, and said second means comprise control means for controlling the speed of said cutterhead positioning motor, said control means including means to transmit a signal from any of said transducers to said cutterhead positioning motor.

5. A suction dredge according to claim 4 wherein said control means include command signal generating means and a comparator to compare said command signal and said signal from any of said transducers to admit a control signal to said cutterhead positioning motor to control the speed thereof.

6. A suction dredge according to claim 4 wherein said control means include command signal generating means, cutter advance speed indicator feedback means for generating a feedback signal and a comparator to compare said command signal and said feedback signal from cutter advance speed indicator feedback means to admit a control signal to said cutterhead positioning motor to control the speed of rotation thereof.

7. A suction dredge according to claim 4 wherein said control means include command signal generating means, a comparator to compare said command signal and a signal from any of said transducers to admit a control signal to an electrical control regulator to vary the signal applied to said one motor to control the speed of rotation thereof.

8. A suction dredge according to claim 4 wherein said control means include an electrical amplifier operatively connected to regulating means for said cutterhead positioning motor and adapted to receive a predetermined signal from any of said transducers, means to generate a control signal connected to said amplifier, a source of current for said transducers and said amplifier, said amplifier being adapted to receive signals from any of said transducers and said control means to transmit a predetermined signal from said amplifier to said cutterhead positioning motor regulating means to vary the power supplied to said cutterhead positioning motor in response to said predetermined signal and thereby vary the rate at which solids are introduced into said suction system and are discharged therefrom.

References Cited

UNITED STATES PATENTS

| | | | |
|---|---|---|---|
| 934,031 | 9/1909 | Askew | 37—58 |
| 1,842,537 | 1/1932 | Brunner | 37—67 |
| 2,644,400 | 7/1953 | Hofer. | |
| 2,661,550 | 12/1953 | Graham | 37—58 |
| 2,889,779 | 6/1959 | Hofer | 37—58 XR |
| 3,111,778 | 11/1963 | Fonnesbeck | 37—58 |
| 3,125,819 | 3/1964 | Kaufmann | 37—54 |
| 3,224,121 | 12/1965 | Denning | 37—58 |

ABRAHAM G. STONE, *Primary Examiner.*

A. E. KOPECKI, R. L. HOLLISTER,
*Assistant Examiners.*